(12) United States Patent
Hubert et al.

(10) Patent No.: US 9,562,790 B2
(45) Date of Patent: Feb. 7, 2017

(54) SYSTEM FOR DELIVERING AT LEAST ONE SHIFTED ANALOGICAL OUTPUT SIGNAL

(71) Applicant: AKTIEBOLAGET SKF, Göteborg (SE)

(72) Inventors: Mathieu Hubert, Tours (FR); Suzanne Blokland, Tours (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/759,004

(22) PCT Filed: Jan. 7, 2013

(86) PCT No.: PCT/EP2013/050167
§ 371 (c)(1),
(2) Date: Jul. 2, 2015

(87) PCT Pub. No.: WO2014/106545
PCT Pub. Date: Jul. 10, 2014

(65) Prior Publication Data
US 2015/0345989 A1 Dec. 3, 2015

(51) Int. Cl.
*G01D 5/12* (2006.01)
*F16C 41/00* (2006.01)
(Continued)

(52) U.S. Cl.
CPC ............... *G01D 5/12* (2013.01); *F16C 41/00* (2013.01); *G01D 5/2448* (2013.01); *G01P 3/487* (2013.01); *G01P 3/489* (2013.01); *G01P 3/443* (2013.01)

(58) Field of Classification Search
CPC .. G01D 5/145; G01D 5/2073; G01D 5/24476; G01D 18/00; G01D 18/008; G01D 5/12; G01D 5/2013; G01D 5/208; G01D 5/24409;G01D 5/24452; G01D 5/245; G01D 5/2451; G01P 13/04; G01P 3/22; G01P 13/045; G01P 3/44; G01P 3/487; G01R 29/0814; G01R 19/0092; G01R 33/0047; H01F 38/14; F16C 19/166; F16C 2233/00; F16C 25/083; F16C 32/0442; F16C 32/0446; F16C 32/0451; F16C 32/0459; F16C 32/0476; F16C 39/066; G01J 3/0218; G01J 3/4412; G01J 3/453; G01M 7/025; H02K 21/14; H02K 7/061; H02K 7/09

See application file for complete search history.

(56) References Cited

U.S. PATENT DOCUMENTS 4,527,120 A * 7/1985 Kurosawa ............... G01P 3/489
318/661
4,566,327 A * 1/1986 Rider ..................... G01C 19/04
73/504.03

FOREIGN PATENT DOCUMENTS

EP 0949510 A1 10/1999
FR 2852464 A1 9/2004
(Continued)

*Primary Examiner* — Vinh Nguyen
(74) *Attorney, Agent, or Firm* — Bryan Peckjian; SKF USA Inc. Patent Dept.

(57) ABSTRACT

A sensor device analogical output signal shifting system including the sensor device including at least two detection cells adapted to equip a mechanical device and deliver at least two analogical output signals depending on behavior of the mechanical device. A shifter circuit selectively processes the analogical output signals and including at least a first part including at least one passive analogical component having a variable parameter and a second part including at least one passive analogical component having a variable parameter; and a control component for controlling the variable parameters of the passive analogical components, a variation of
(Continued)

these variable parameters shifting at least one of the sensor device analogical output signals in the circuit. The circuit delivers at least two sensor device analogical output signals, including at least one shifted output signal including the first shifted analogical output signal and/or the second shifted sinusoidal signal of the sensor device.

17 Claims, 2 Drawing Sheets

(51) Int. Cl.
*G01P 3/489* (2006.01)
*G01D 5/244* (2006.01)
*G01P 3/487* (2006.01)
G01P 3/44 (2006.01)

(56) References Cited

FOREIGN PATENT DOCUMENTS

| WO | 2007/077389 A2 | 7/2007 |
| WO | 2010/082086 A1 | 7/2010 |
| WO | 2011/070391 A | 6/2011 |

* cited by examiner

SYSTEM FOR DELIVERING AT LEAST ONE SHIFTED ANALOGICAL OUTPUT SIGNAL

CROSS REFERENCE TO RELATED APPLICATIONS

This is a United States National Stage Application claiming the benefit of International Application Number PCT/EP2013/050167 filed on 7 Jan. 2013 (07.01.2013), which is incorporated herein by reference in its entirety.

TECHNICAL FIELD OF THE INVENTION

The invention concerns a system and a method for shifting at least one analogical output signal of a sensor device. The invention also concerns a sensor-bearing unit including a bearing and such a system. The invention also concerns a shifter module.

BACKGROUND OF THE INVENTION

It is known to equip a mechanical device, such as a motor including a rotor and a stator, with a sensor-bearing unit for tracking the rotation of the rotor relative to the stator. Other mechanical devices including a mobile part and a stationary part may be equipped with such a sensor device, for example power steering, alternator and rack rails devices. Depending on the mechanical device, the mobile part may move in rotation or in translation. Thus, the sensor device may include a rotation angle sensor or a linear sensor.

In other words, each mechanical device is equipped with a dedicated sensor device, implying a specific indexation to provide effective measurements.

Some customers using sensor-bearing units do not have a lot of experience and knowledge on the motor control strategies and therefore use off-the-shelve solutions. These solutions often only accept a very precise indexation of the sensor-bearing output signals with the rotor magnetic field. Typically, an error of only ±8 degrees may be accepted between the zero-index of the output signals and the zero-index of the rotor if this error may be adjusted by a controller, and an error of only ±0.5 degrees may be accepted in case there is no adjustment in a controller.

Mechanically, the zero-index can be set in two ways: pre-indexing the rotor with the shaft (achieved by the motor manufacturer) and/or pre-indexing the shaft with the sensor (achieved by motor manufacturer or sensor manufacturer). These methods are difficult and costly to implement since they involve a precise mechanical indexation.

For instance, it is known to mount a sensor-bearing unit with a degree of freedom on a shaft, allowing the sensor to rotate in order to mechanically shift the output signals with respect to the rotor. A rotation of the sensor up to 180 degrees around the rotor may be necessary to provide correct shift. Such a method is difficult to implement and requires specific tooling for precise indexation of mechanical angular offset.

WO-A-2007/077389, corresponding to the preamble of claim 1, describes a system for detecting the angular position of a rotating element with respect to a non-rotating element. Sensors are fixed to the rotating or the non-rotating element and their output signals are processed to generate a differential signal.

WO-A-2010/082086 describes a method and a device for sensing an absolute rotation angle of an electric energy assisted steering, comprising a rotor mobile around a rotation axis and through several revolutions. The sensing device is connected to an electronic control unit (ECU) having a signal processor, a converter, a calculating processor and an integrating unit. ECU adjusts the offset and the gain of output signal of the sensing device.

WO-A-2011/070391 describes a method and a device for estimating the angular position of a rotating device with respect to a stationary device. The measuring device includes several angle sensors connected to an electronic control unit (ECU) for generating and treating signals to estimate the angular position of the rotating device.

SUMMARY OF THE INVENTION

The aim of the invention is to provide simple system and method for shifting at least one of the analogical output signals of a sensor device.

To this end, the invention concerns a system for shifting at least one analogical output signal of a sensor device, the system comprising the sensor device which includes at least two detection cells adapted to equip a mechanical device and which delivers at least two analogical output signals depending on behavior of the mechanical device.

This system is characterized in that it also comprises, in addition to the sensor device:

a shifter circuit selectively processing the at least two analogical output signals and comprising at least:
a first part including at least one passive analogical component having a variable parameter, the first part being configured to selectively process the at least two analogical output signals to deliver a first shifted analogical output signal of the sensor device, and
a second part including at least one passive analogical component having a variable parameter, the second part being configured to selectively process the at least two analogical output signals to deliver a second shifted sinusoidal signal of the sensor device, different from the first shifted analogical output signal; and
control means for controlling the variable parameters of the passive analogical components, a variation of these variable parameters shifting at least one of the analogical output signals of the sensor device in the shifter circuit;
and in that the shifter circuit delivers at least two analogical output signals of the sensor device, among which at least one shifted output signal including the first shifted analogical output signal and/or the second shifted sinusoidal signal of the sensor device.

Thanks to the invention, electrical angular offset may be shifted without needing a precise indexation of mechanical angular offset. Moreover, no intervention of the user inside the software of a complex controller is needed. Advantageously, the shifter circuit and the control means can be added to an existing sensor device, without modifying this sensor device and its inner components. With the simple, cheap and efficient system and method according to the invention, a maximum realizable shift of almost 90 degrees can be obtained, as detailed hereafter.

According to further aspects of the invention which are advantageous but not compulsory, such a system may incorporate one or several of the following features:

The shifter circuit delivers two shifted analogical output signal, which are the first shifted analogical output signal and the second shifted sinusoidal signal.
The first part and the second part of the shifter circuit each includes a primary passive analogical component having a variable primary parameter, preferably having the same value, a simultaneous variation of the variable primary parameters by the control means shifts the at least two analogical output signals of the sensor device on a primary predetermined shift interval, and the shifter circuit delivers two shifted analogical output signal.

The first part includes two secondary passive analogical component each having a variable secondary parameter, while the second part includes one secondary passive analogical component having a variable secondary parameter, preferably having the same value than one of the two secondary parameters of the first part, a simultaneous variation of the variable secondary parameters by the control means shifts the at least two analogical output signals of the sensor device on a secondary predetermined shift interval distinct from the primary predetermined shift interval, and the shifter circuit delivers two shifted analogical output signal.

The first part of the shifter circuit includes only one passive analogical component having a variable parameter and the second part of the shifter circuit includes only one passive analogical component having a variable parameter, a simultaneous variation of the two variable parameters by the control means shifts the analogical output signal of the sensor device on a predetermined shift interval, and the shifter circuit delivers two shifted analogical output signal.

The first part is a cosine part and the first shifted analogical output signal is a cosine signal, the second part is a sine part and the second shifted analogical output signal is a sine signal, and an arctangent function applied to a division of the sine signal by the cosine signal corresponds to a rotation angle of a rotating part relative to a stationary part of the mechanical device.

The control means comprise at least one potentiometer associated with at least one of the passive analogical components and adapted to selectively modify the variable parameter of this passive analogical component.

The control means comprise an emitter adapted to selectively act on at least one of the passive analogical components and to modify the variable parameter of this passive analogical component.

The emitter is a laser emitter adapted to selectively emit a laser ray on at least one of the passive analogical components and to modify the variable parameter of this passive analogical component.

At least one of the passive analogical components is a resistor component and its variable parameter is a resistance value.

At least one of the passive analogical components is an inductor component and its variable parameter is an inductance value.

At least the detection cells of the sensor and the first part and the second part of the shifter circuit are located together in a housing of the sensor device.

The first part and the second part of the shifter circuit are located together in a shifter housing, which is handleable independently of a housing of the sensor device.

The control means are also located inside the shifter housing.

The invention also concerns a sensor-bearing unit including a bearing and a system as mentioned here-above, wherein the sensor of the system and the bearing equip a stationary part and a rotating part of the mechanical device. Preferably, an outer ring of the bearing and the detection cells of the sensor are mounted on the outer stationary part of the mechanical device, while an inner ring of the bearing and an encoder associated with the detection cells are mounted on the inner rotating part of the mechanical device. Alternatively, an inner ring of the bearing and the detection cells of the sensor are mounted on the inner stationary part of the mechanical device, while an outer ring of the bearing and an encoder associated with the detection cells are mounted on the outer rotating part of the mechanical device.

The invention also concerns a shifter module including:
  a shifter circuit, belonging to a system wherein the first part and the second part of the shifter circuit are located together in a shifter housing, which is handleable independently of a housing of the sensor device; and
  a shifter housing, in which the shifter circuit is located and which is handleable independently of a housing of the sensor device belonging to the system.

Preferably, the control means belonging to the system are also located inside the shifter housing.

The invention also concerns a method for shifting at least one analogical output signal of a sensor device, which comprises at least two detection cells adapted to equip a mechanical device, wherein the method includes at least the following steps:
  (A) the sensor device delivers at least two analogical output signals depending on behavior of the mechanical device;
  (B) a shifter circuit selectively processes the analogical output signals, with:
     a first part of the shifter circuit, including at least one passive analogical component having a variable parameter, selectively processes the at least two analogical output signals to deliver a first shifted analogical output signal; and/or
     a second part of the shifter circuit, including at least one passive analogical component having a variable parameter, selectively processes the at least two analogical output signals to deliver a second shifted analogical output signal, different from the first shifted analogical output signal;
  (C) control means, forming a shifting system together with the sensor device and the shifter circuit, control the variable parameters of the passive analogical components, a variation these variable parameters shifting at least one of the analogical output signals of the sensor device in the shifter circuit; and
  (D) the shifter circuit delivers at least two analogical output signals of the sensor device, among which at least one shifted output signal including the first shifted analogical output signal and/or the second shifted sinusoidal signal of the sensor device.

Preferably, steps (A), (B), (C) and (D) of this method are simultaneous or substantially simultaneous.

BRIEF DESCRIPTION OF THE DRAWINGS

The invention will now be explained in correspondence with the annexed figures, and as an illustrative example, without restricting the object of the invention. In the annexed figures.

DETAILED DESCRIPTION OF SOME EMBODIMENTS

Figure 1:
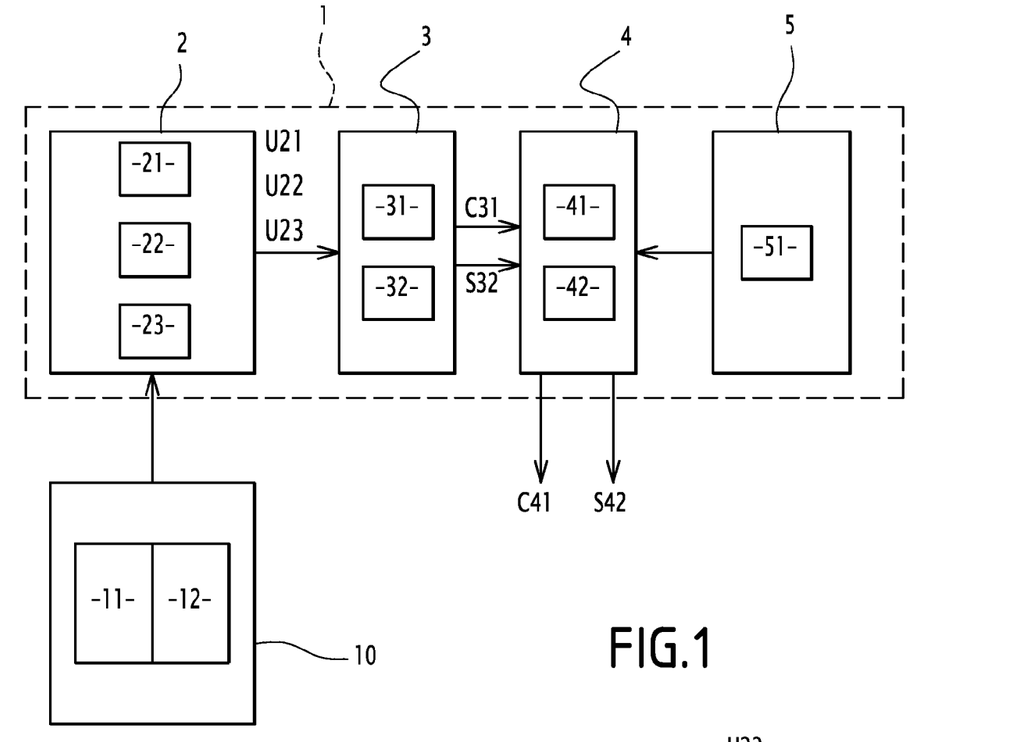
FIG. 1 is a schematic representation of a system according to the invention, including a sensor associated with a mechanical device, a converter circuit, a shifter circuit and control means.

The system 1 shown on FIG. 1 may be implemented for shifting at least one analogical output signal C31 and/or S32 of a sensor device 2+3.

The system 1 comprises a sensor 2, a converter electronic circuit 3, a shifter electronic circuit 4 and control means 5. Sensor 2 and circuit 3 forms together the sensor device 2+3, which delivers the two analogical output signals C31 and S32. Sensor 2 cooperates with a mechanical device 10, while converter electronic circuit 3 cooperates with shifter electronic circuit 4 and control means 5, as detailed hereafter.

Figure 2:
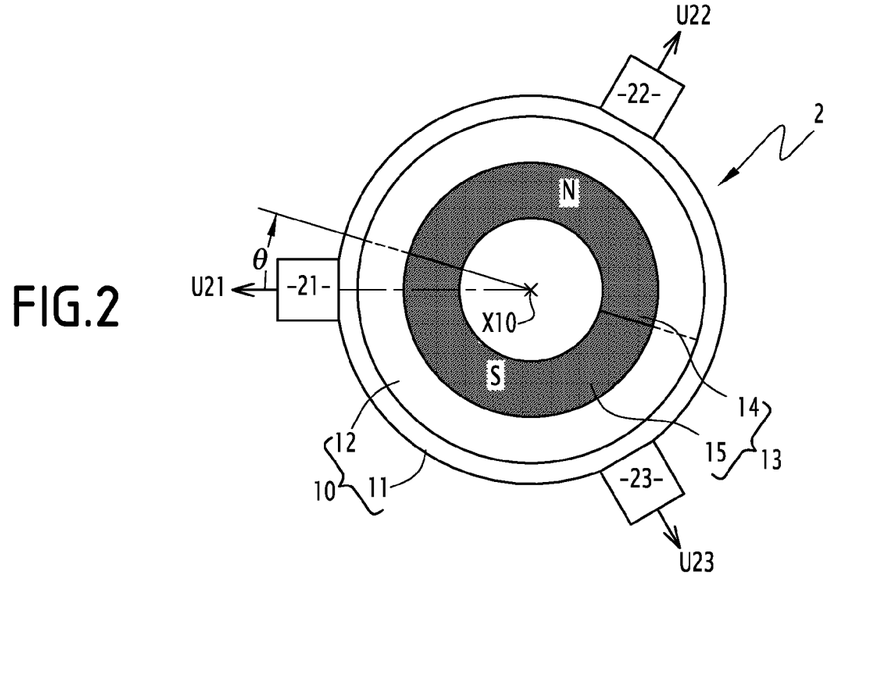
FIG. 2 is a schematic representation of the mechanical device of FIG. 1, of the motor type, including a rotor and a stator, equipped with detection cells belonging to the sensor.

Preferably, sensor 2 and mechanical device 10 may be configured as the detection system described (FIG. 1 and associated description) in WO-A-2007/077389, while the circuit 3 may be configured as the electronic processing circuit described (FIG. 3 and associated description) in WO-A-2007/077389, which is incorporated herein by reference As shown on the example of FIGS. 1 and 2, sensor 2 includes three detection cells 21, 22 and 23, adapted to equip the mechanical device 10 and to deliver respective voltage signals U21, U22 and U23 depending on the behavior of the mechanical device 10. Sensor 2 is an analogical sensor measuring continuous information and cells 21-23 are analogical detection cells delivering analogical voltage signals U21-U23. Converter circuit 3 processes the voltage signals U21-U23 to deliver the analogical output signals C31 and S32 of the sensor device 2+3, depending on the behavior of mechanical device 10. Shifter circuit 4 processes the analogical output signals C31 and S32 and delivers at least one shifted analogical output signals C41 and/or S42 of the sensor device 2+3. Control means 5 are adapted to selectively act on the shifter circuit 4 to shift at least one of the analogical output signals C31 and/or S32 and to deliver at least one shifted analogical output signal C41 and/or S42 of the sensor device 2+3, in order to adjust its zero-index relative to mechanical device 10.

According to the invention, sensor 2 must comprise at least two detection cells. In the simplest configuration, sensor 2 includes only two detection cells placed at different angles and delivering two voltage signals U21 and U22. In this case, the converter circuit 3 is unnecessary and the sensor device comprises sensor 2 only. Also, shifter circuit 4 is adapted to process directly the voltage signals U21 and U22 as analogical output signals of the sensor device 2. Thus, system 1 comprises sensor device 2, shifter circuit 4 and control means 5.

Alternatively, sensor 2 may include three or more detection cells, depending on the accuracy required for sensor device 2+3.

According to another embodiment of the invention, the sensor device may comprise sensor 2 only, while converter circuit 3 is integrated to the shifter circuit 4. Thus, system 1 comprises sensor device 2, shifter circuit 3+4 and control means 5.

As shown on FIG. 2, the mechanical device 10 may be of the rotating type and be equipped with an absolute rotation angle sensor 2, according to a configuration described in documents WO-2007-A-077389, WO-A-2010/082086 or WO-A-2011/070391, which are incorporated herein by reference.

The mechanical device 10 comprises a stationary part 11 and a rotating part 12 centered on a central axis X10. Stationary part 11 may include a housing and a stator and is represented by a circle on FIG. 2 for simplification purpose. Rotating part 12 may include a rotor belonging to an electric energy assisted steering unit (EPAS). Rotating part 12 is shaped as an annular ring with a symmetry of revolution around axis X10.

Sensor 2 can be either integrated into the motor or located close to the motor of the EPAS. Sensor 2 comprises the detection cells 21-23, such as Hall-effect cells, and an encoder 13, such as a magnet. Alternatively, any suitable detection technology may be used for cells 21-23 and encoder 13, such as optical or induction technologies.

Cells 21-23 are positioned on stationary part 11, at a detection distance from encoder 13 which is fast in rotation around axis 10 with rotating part 12. Encoder 13 forms an annular ring around axis X10 and comprises a pair of magnetic poles 14 and 15, more precisely a north (N) pole 14 and a south (S) pole 15. Encoder 13 extends along the whole circumference of axis X10, with N pole 14 and S pole 15 disposed oppositely around axis X10. Preferably, encoder 13 comprises a higher number of pairs of poles, for example sixty-four pairs of poles 14 and 15. Cells 21-23 are adapted to sense N pole(s) 14 and S pole(s) 15 when rotating part 12 rotates. Thus, each cell 21-23 delivers a voltage signal U21-U23 depending on the rotation of rotating part 12 around axis X10 relative to stationary part 11.

Cells 21, 22 and 23 are regularly distributed at 0 degrees, 120 degrees and 240 degrees around axis X10. Cells 21, 22 and 23 are adapted to output voltage signals, respectively U21, U22 or U23, which are representative of the current absolute angular position of rotating part around axis X10, such as disclosed in WO-A-2007/077389, which is incorporated herein by reference. Each cell 21, 22 and 23 is supplied with a constant voltage and generates an output voltage which varies according to the magnetic field generated by the encoder 13 and sensed by the cell.

As shown on FIG. 1, the electronic circuit 3 comprises a first part 31 and a second part 32 both receiving voltage signals U21-U23 from cells 21-23, while the shifter circuit 4 comprises a first part 41 and a second part 42 both receiving the signals C31 and S42 from circuit 3. Depending on the configuration of the sensor device, circuit 3 may be unnecessary or directly integrated in circuit 4. Circuits 3 and 4 may also comprise several electronic devices and components, such as power supply means, signal filters, counter, memory, wires and connectors, not shown for simplification purpose. Each device or component may be analogical and/or numerical. Preferably, circuits 3 and 4 include analogical devices and components, transmitting analogical signals.

In reference to the mechanical assembly including sensor 2 and mechanical device 10 on FIG. 2, the electronic circuit 3 may be configured in a way close or similar to document WO-A-2007/077389, except the differences detailed hereafter Preferably, detection cells 21-23 of sensor 2 and electronic circuit 3 are located together in a housing of the sensor device 2+3. Thus, sensor device 2+3 is compact and simple to mount on mechanical device 10.

Advantageously, first part 41 and second part 42 of shifter circuit 4 are located in a shifter housing, which is handleable independently of the housing of the sensor device 2+3. Also preferably, shifter circuit 4 and control means 5 may be included in the same shifter housing. Shifter circuit 4 and shifter housing form a shifter module, easily handleable and accessible for an operator of system 1. Preferably, control means 5 are integrated in the shifter module. To implement system 1, sensor device 2+3 may remain unmodified, while shifter module 4+5 is added to the sensor device 2+3.

Alternatively, at least sensor 2 and shifter circuit 4 may be located together in a housing of the sensor device.

Within converter circuit 3, first part 31 delivers a cosine signal C31, while second part 32 delivers a sine signal S32. In other words, they may be designated as cosine part 31 and sine part 32, or else interpolating parts 31 and 32 since they are adapted to integrate the voltage signals U21-U23 from detection cells 21-23. Signals C31 and S32 are shifted with respect to each other by a predetermined offset, corresponding to 90 degrees. Preferably, filters are inserted between cells 21-23 and interpolating parts 31 and 32 in order to clean voltage signals U21-U23. Thus, electronic circuit 3 is adapted to integrate the voltage signals U21-U23 from detection cells 21-23. Depending on the configuration of the sensor device, by example if such an integration is unnecessary, the circuit 3 may be unnecessary.

Within shifter circuit 4, first part 41 processes signals C31 and S32 to deliver a cosine signal C41, while second part 42 processes signals C31 and S32 to deliver a sine signal S42. In other words, they may be designated as cosine part 41 and sine part 42.

Figure 3:
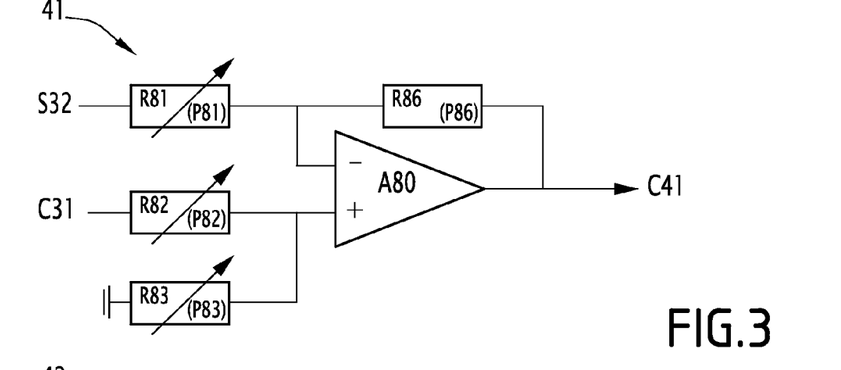
FIGS. 3 and 4 each are an electronic diagram, respectively of a first and a second electronic parts belonging to the shifter circuit of FIG. 1.

As shown on FIG. 3, cosine part 41 includes an operational amplifier A80 and four resistors R81, R82, R83 and R86. Resistor R81 receives signal S32 from sine part 32, while resistor R82 receives signal C31 from cosine part 31. Resistor R83 is connected to electrical ground, in other words receives a voltage U0 whose value is equal to zero volts. Resistor R86 is disposed in parallel with the amplifier A80. Resistors R81-R86 are passive analogical components. Resistors R81, R82 and R83 each have a variable resistance parameter P81, P82 or P83, while resistor R86 has a fixed resistance parameter P86. A variation of parameter P81, P82 and/or P83 modifies the analogical cosine signal C41.

Figure 4:
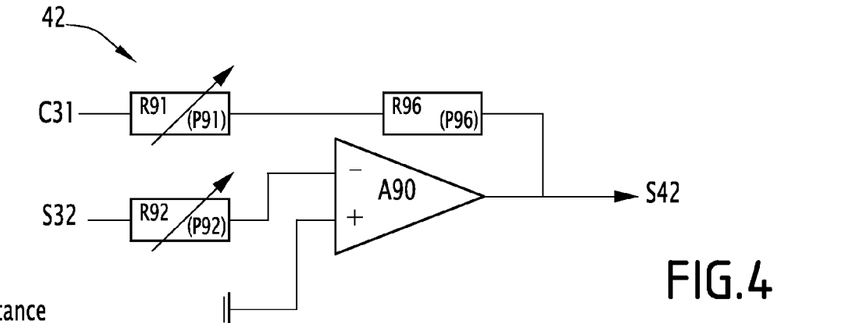

As shown on FIG. 4, sine part 42 includes an operational amplifier A90 and three resistors R91, R92 and R96. Resistor R91 receives signal C31 from cosine part 31, while resistor R92 receives signal S32 from sine part 32. Resistor R96 is disposed in parallel with the amplifier A90. Resistors R91-R96 are passive analogical components. Resistors R91 and R92 each have a variable resistance parameter P91 or P92, while resistor R96 has a fixed resistance parameter P96. A variation of parameter P91 and/or P92 modifies the analogical sine signal S32.

In practice, shifter circuit 4 is adapted to deliver analogical output signals of sensor device 2+3 to another electronic device located outside sensor device 2+3, among which at least one shifted output signal C41 and/or S42 including the cosine signal C41 and/or the sine signal S42 of the sensor device 2+3. In a particular embodiment wherein circuit 4 delivers only one shifted signal C41 and/or S42, circuit 4 may be configured to deliver at least one of the unshifted signals C31 and/or S31. Preferably, circuit 4 delivers both shifted signal C41 and S42.

Advantageously, an arctangent function applied to a division of sine signal S42 by cosine signal C41 corresponds to a rotation angle θ of rotating part 12 relative to stationary part 11 of mechanical device 10.

According to this preferred embodiment of the invention, the operation of shifter circuit 4 corresponds to the following trigonometric formulas:

$$C41 = \cos(\theta+\theta s) = \cos(\theta)\cdot\cos(\theta s) - \sin(\theta)\cdot\sin(\theta s) = C31\cdot\cos(\theta s) - S32\cdot\sin(\theta s) \quad (1)$$

$$S42 = \sin(\theta+\theta s) = \sin(\theta)\cdot\cos(\theta s) + \cos(\theta)\cdot\sin(\theta s) = S32\cdot\cos(\theta s) + C31\cdot\sin(\theta s) \quad (2)$$

Since the shift angle θs must be variably chosen, but is fixed afterwards by implementing system 1 on the mechanical device 10, the two coefficients cos(θs) and sin(θs) of equations (1) and (2) become constants, respectively a1 and b1.

$$\begin{aligned} C41 &= C31.a1 - S32.b1 \\ &= C31 \times ((P81+P86)/(P82+P83)) \times \\ &\quad P83/P86 - S32 \times P86/P81 \end{aligned} \quad (3)$$

$$\begin{aligned} S42 &= S32.a1 + C31.b1 \\ &= -S32 \times P96/P91 - C31 \times P96/P92 \end{aligned} \quad (4)$$

As shown in equation (3) and (4), the coefficient a1 and b1 are related to parameters P81, P82, P83, P86, P91, P92 and P96. The parameters P86 and P96 are fixed resistance values, which may be calculated as described hereafter, while the parameters P81, P82, P83, P91 and P92 are variable resistance values.

According to the invention, control means 5 are adapted to shift selectively at least one of the analogical output signals C31 and S32 in a simple way, without needing a specific and complex electronic controller unit. Preferably, control means 5 are adapted to shift both analogical output signals C31 and S32 simultaneously in the shifter circuit 4, as described here-after, so that the shifter circuit 4 delivers two shifted signal C41 and S32. In other words, system 1 and more precisely shifter circuit 4 and control means 5 are adapted to shift selectively at least one analogical output signal of sensor device 2+3 and deliver at least two analogical output signals of the sensor device, among which at least one shifted output signal C41 and/or S42. In certain cases, system 1 may deliver only one shifted signal C41 and S42. Preferably both output signals C31 and S32 are shifted and both shifted signals C41 and S42 are delivered.

As shown on FIG. 1, control means 5 include at least one device 51, such as a potentiometer, an emitter or an actuator, adapted to act on variable resistors R81, R82, R83, R91 and/or R92 to selectively modify resistance parameters P81, P82, P83, P91 and/or P92. Device 51 may be a potentiometer associated with at least one of the resistors R81, R82, R83, R91 and/or R92 and adapted to selectively modify the variable parameter(s) P81, P82, P83, P91 and/or P92 of this resistor(s). Device 51 may be an emitter, preferably a heat energy emitter, such as a laser emitter adapted to selectively emit a laser ray on at least one of the resistors R81, R82, R83, R91 and/or R92 and to modify the variable parameter(s) P81, P82, P83, P91 and/or P92 of this resistor(s).

Preferably, control means 5 are adapted to modify, one the one hand, the variable resistance parameters P82 and P91 of the resistors R82 and R91 simultaneously and, on the other hand, the variable resistance parameters P81, P83 and P92 of the resistors R81, R83 and R92 simultaneously. Also preferably, parameters P82 and P91 have the same value, while parameters P81 and P92 have the same value.

Figure 5:
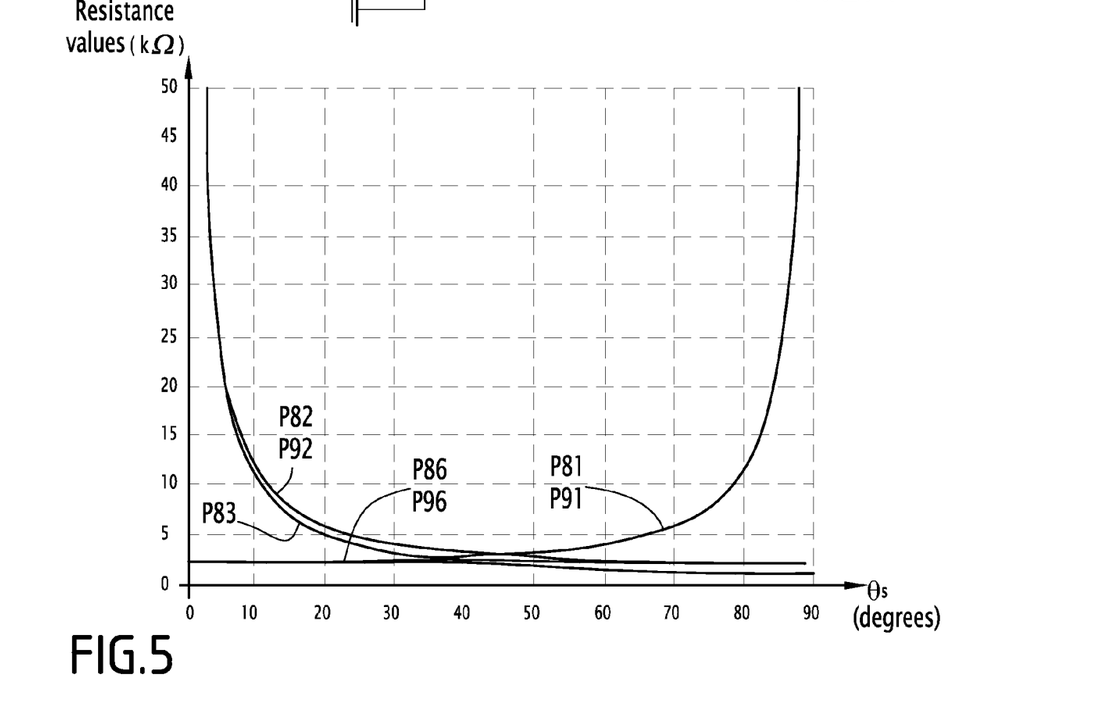
FIG. 5 is a graph corresponding to a simulation conducted on the electronic parts of FIGS. 3 and 4, with variations of parameters associated with passive analogical components.

Graph of FIG. 5 depicts the operating principle of the invention. Shift angle θs corresponding to signals C41 and C42 is represented in degrees on the abscissa axis, while resistance values in kiloOhm (kΩ) are represented on the ordinate axis. More precisely, the resistance values P81, P82, P83, P86, P91, P92 and P96 are those of resistors R81, R82, R83, R86, R91, R92 and R96 of cosine part 41 and sine part 42.

Shifting is simulated by modifying cosine part 41 and sine par 42 within shifter circuit 4. More precisely, for each value of shift angle θs on a shift interval extending from 0 to 90 degrees, the corresponding resistance values P81, P82, P83, P86, P91, P92 and P96 of resistors R81, R82, R83, R86, R91, R92 and R96 are determined. In standard design, used shift angle θs is 45 degrees since this gives the same coefficients and thus resistance values for cosine part 41 and sine part 42.

According to simulation, shift angle θs extends from 0 to 90 degrees to cover a complete shift interval without peaks. On the other shift interval extending from 90 to 180 degrees, from 180 to 270 degrees and from 270 to 360 degrees, the simulation provides similar results. Each 90 degrees, a peak appears where the value of corresponding resistors R81, R83 and R92 on the one hand, or resistors R82 and R91 on the other hand, becomes infinite. In practice, a shift interval has to be chosen such that there are no peaks in the varying resistance values, for both cosine part 41 and sine part 42. Indeed, peaks are highly nonlinear and a variable resistor having such a profile is hard or impossible to find. In other words, the maximum possible angle shift interval is almost 90 degrees, by instance a shift range of almost 82-88 degrees. Peaks are present for boundary values of 0 and 90 degrees.

At this stage, parameters P86 and P96 are fixed as constant resistance values corresponding to average values over the shift interval. For example, parameters P86 and P96 are equal to 2.05 kΩ. In the interval from 0 to 45 degrees, parameters P82 and P91 can be fixed as constant resistance values corresponding to their average values over this interval, while a variation of parameters P81, P83 and P92 aims to obtain the desired shift θs. In the interval from 45 to 90 degrees, parameters P81, P83 and P92 can be fixed as constant resistance values corresponding to their respective average values over this interval, while a variation of parameters P82 and P91 aims to obtain the desired shift θs. As shown on FIG. 5, parameters P82 and P91 have the same value, while parameters P81 and P92 have the same value. Besides, as an approximation for simplification purpose, parameter P83 is considered to be equal to P81 minus a predetermined value, for example 0.9 kΩ.

In practice, signals C31 and S32 are processed within circuit 4 and shifted signals C41 and S42 are delivered by using the resistance values which are closest to the ideal solution determined by simulation. In other words, the aforementioned parameters P81, P82, P83, P86, P91, P92 and P96 of cosine part 41 and sine part 42 are determined to be as close as possible of their ideal resistance values. The error increase is maximum 0.23 degrees with respect to the non-shifted output, and can decrease even to 0.4 degrees less than the original error.

Thus, a maximum realizable shift of nearly 90 degrees can be obtained in a simple manner thanks to system 1. System 1 is not compulsorily connected to an electronic control unit (ECU). Even if system 1 is connected to such an ECU, shifting of at least one of the analogical output signals of the sensor device may be accomplished by shifter circuit 4 and controls means 5 of system 1, without complex operations of the ECU.

Other non-shown embodiments of system 1 can be implemented without leaving the scope of the invention. Particularly, system 1 may comprise different configurations of sensor device 2+3 or 2, shifter circuit 4 or 3+4 and/or control means 5. Moreover, system 1 may be adapted to different mechanical devices 10. Sensor 2 may equip any mechanical device where a specific behavior, as a movement of rotation or translation, is measured. For example, sensor 2 may equip an electric vehicle, a starter alternator or an in-wheel motor for fork lift truck.

According to another possible embodiment of the invention, system 1 may comprise a shifter circuit 4 adapted to deliver more than two analogical output signals of a sensor device 2+3. In this case, control means 5 are also adapted to shift at least one shifted analogical output signal of sensor device 2+3.

Whatever the embodiment, the shifting system 1 comprises a sensor device, a shifter circuit and control means. The shifter circuit is integrated in system 1 in addition to sensor device, in other words these elements of the system 1 are separate but communicate for transfers of signals. System 1 is adapted to shift at least one analogical output signal (C31, S32; C31; S32; U21, U22, U23; U21, U22; U21; U22; U23) of the sensor device, which includes at least two detection cells 21-23 adapted to equip a mechanical device 10 and which delivers at least two analogical output signals (C31, S32; U21, U22, U23; U21, U22) depending on behavior of the mechanical device 10. Shifter circuit selectively processes the at least two analogical output signals (C31, S32; U21, U22, U23; U21, U22). Shifter circuit comprises at least, on the one hand, a first part 41 including at least one passive analogical component (R82; R81, R83; R81, R82, R83) having a variable parameter (P82; P81, P83; P81, P82, P83) and, on the other hand, a second part 42 including at least one passive analogical component (R91; R92; R91, R92) having a variable parameter (P91; P92; P91, P92). The first part 41 is configured to selectively process the at least two analogical output signals (C31, S32; U21, U22, U23; U21, U22) to deliver a first shifted analogical output signal C41 of the sensor device. The second part 42 is configured to selectively process the at least two analogical output signals (C31, S32; U21, U22, U23; U21, U22) to deliver a second shifted sinusoidal signal S42 of the sensor device, different from the first shifted analogical output signal C41. Control means 5 control the variable parameters (P82, P91; P81, P83, P92; P81, P82, P83, P91, P92) of the passive analogical components (R82, R91; R81, R83, R92; R81, R82, R83, R91, R92). A variation of these variable parameters (P82, P91; P81, P83, P92; P81, P82, P83, P91, P92) shifts at least one of the analogical output signals (C31, S32; C31; S32; U21, U22, U23; U21; U22; U23) of the sensor device in the shifter circuit. The shifter circuit delivers at least two analogical output signals of the sensor device, among which at least one shifted output signal (C41, S42; C41; S42) including the first shifted analogical output signal C41 and/or the second shifted sinusoidal signal S42 of the sensor device.

According to a main embodiment shown on FIGS. 1 to 5, the first part 41 and the second part 42 of the shifter circuit 4 each includes a primary passive analogical component, respectively R82 and R91, having a variable primary parameter, respectively P82 and P91. Preferably, these primary parameters have the same value. A simultaneous variation of the primary parameters P82 and P91, by the control means 5, is adapted to shift the analogical output signals C31 and S32 of the sensor device 2+3 on a primary predetermined shift interval 45°-90°, so that the shifter circuit 4 delivers the shifted analogical output signals C41 and S42. Also, the first part 41 includes two secondary passive analogical component R81 and R83, each having a variable secondary parameter P81 and P83, while the second part 42 includes one secondary passive analogical component R92 having a variable secondary parameter P92. Preferably, the secondary parameter P81 has the same value than the secondary parameter P92. A simultaneous variation of the variable secondary parameters P81, P83 and P92 by the control means 5 is adapted to shift the analogical output signals C31 and S32 of the sensor device 2+3 on a secondary predetermined shift interval 0°-45°, distinct from the primary predetermined shift interval 45°-90°, so that the shifter circuit 4 delivers the shifted analogical output signals C41 and S42.

According to another embodiment, the first part 41 may include only one passive analogical component, selectively R81 or R82, having a variable parameter P81 or P82, while the second part 42 may include only one passive analogical component (either R92 if component R81 has a variable parameter P81 or R91 if component R82 has a variable parameter) which has a variable parameter P92 or P91. Other components may have fixed parameters. A simultaneous variation of the two variable parameters by the control means 5 is adapted to shift the analogical output signals C31 and S32 of the sensor device 2+3 on a predetermined shift interval 45°-90° or 0°-45°, so that the shifter circuit 4 delivers the shifted analogical output signals C41 and S42.

According to a non-shown embodiment, mechanical device 10 includes a mobile part 12 moving in translation relative to stationary part 11, such as in a rail rack device. In this case, system 1 includes a linear sensor device 2+3. Shifter circuit 4 and control means 5 of system 1 are adapted to shift the analogical output signals of the sensor device 2+3, in order to adjust its zero-index relative to mechanical device 10.

According another non-shown embodiment, shifter circuit 4 may include other passive analogical components in place of resistors. For instance, at least one of the passive analogical components is an inductor component and its variable parameter is an inductance value.

In addition, technical features of the different embodiments can be, in whole or part, combined with each other. Thus, the system 1 can be adapted in terms of cost, functionality or to any specific requirements of the application.

The invention claimed is:
1. A system for shifting at least one analogical output signal of a sensor device, the system comprising the sensor device which includes at least two detection cells adapted to equip a mechanical device and which delivers at least two analogical output signals depending on behavior of the mechanical device;
wherein the system also comprises, in addition to the sensor device:
a shifter circuit selectively processing the at least two analogical output signals and comprising at least:
a first part including at least one passive analogical component having a variable parameter, the first part being configured to selectively process the at least two analogical output signals to deliver a first shifted analogical output signal of the sensor device, and
a second part including at least one passive analogical component having a variable parameter, the second part being configured to selectively process the at least two analogical output signals to deliver a second shifted sinusoidal signal of the sensor device, different from the first shifted analogical output signal; and
a control component for controlling the variable parameters of the passive analogical components, a variation of these variable parameters shifting at least one of the analogical output signals of the sensor device in the shifter circuit; and
wherein the shifter circuit delivers at least two analogical output signals of the sensor device, among which at least one shifted output signal including at least one of the first shifted analogical output signal and the second shifted sinusoidal signal of the sensor device,
wherein the first part and the second part of the shifter circuit each includes a primary passive analogical component having a variable primary parameter,
wherein each variable primary parameter comprises a simultaneous variation,
wherein the simultaneous variation is adopted by the control component to shift the at least two analogical output signals of the sensor device on a primary predetermined shift interval (45°-90°), and
wherein the shifter circuit delivers two shifted analogical output signals.

2. The system according to claim 1, wherein the shifter circuit delivers two shifted analogical output signal, which are the first shifted analogical output signal and the second shifted sinusoidal signal.

3. The system according to claim 1, wherein the first part includes two secondary passive analogical component, each having a variable secondary parameter, while the second part includes one secondary passive analogical component having a variable secondary parameter, wherein each variable secondary parameter comprises a simultaneous second variation, wherein the simultaneous second variation is adopted by the control component to shift the at least two analogical output signals of the sensor device on a secondary predetermined shift interval (0°-45°) distinct from the primary predetermined shift interval (45°-90°), and wherein the shifter circuit delivers two shifted analogical output signals.

4. The system according to claim 1, wherein the first part of the shifter circuit includes only one passive analogical component having a variable parameter and the second part of the shifter circuit includes only one passive analogical component having a variable parameter, wherein each of the two variable parameters comprises a simultaneous variation, wherein the simultaneous variation is adopted by the control component to shift the analogical output signal of the sensor device on a predetermined shift interval (45°-90°; 0°-45°), and wherein the shifter circuit delivers two shifted analogical output signals.

5. The system according to claim 1, wherein the first part is a cosine part and the first shifted analogical output signal is a cosine signal, wherein the second part is a sine part and the second shifted analogical output signal is a sine signal, and wherein an arctangent function applied to a division of the sine signal by the cosine signal corresponds to a rotation angle of a rotating part relative to a stationary part of the mechanical device.

6. The system according to claim 1, wherein the control component comprises at least one potentiometer associated with at least one of the passive analogical components, and wherein the potentiometer is configured to selectively modify the variable parameter of this passive analogical component.

7. The system according to claim 1, wherein the control component comprises an emitter configured to selectively act on at least one of the passive analogical components and configured to modify the variable parameter of this passive analogical component.

8. The system according to claim 7, wherein the emitter is a laser emitter configured to selectively emit a laser ray on at least one of the passive analogical components and configured to modify the variable parameter of the associated at least one passive analogical component.

9. The system according to claim 1, wherein at least one of the passive analogical components is a resistor component and a variable parameter of the resistor component is a resistance value.

10. The system according to claim 1, wherein at least one of the passive analogical components is an inductor component and a variable parameter of the inductor component is an inductance value.

11. The system according to claim 1, wherein at least the detection cells of the sensor and the first part and the second part of the shifter circuit are located together within a housing of the sensor device.

12. The system according to claim 1, wherein the first part and the second part of the shifter circuit are located together within a shifter housing, which is handleable independently of a housing of the sensor device.

13. The system according to claim 12, wherein the control component is also located inside the shifter housing.

14. The system according to claim 1, wherein the sensor system is integrated into a sensor bearing unit including a bearing, wherein the sensor of the sensor system and the bearing equip a stationary part and a rotating part of the mechanical device.

15. A shifter module, including:
a shifter circuit belonging to a system, the system comprising:
  a sensor device which includes at least two detection cells adapted to equip a mechanical device and which delivers at least two analogical output signals depending on behavior of the mechanical device;
  wherein the shifter circuit selectively processing the at least two analogical output signals and comprising at least:
    a first part including at least one passive analogical component having a variable parameter, the first part being configured to selectively process the at least two analogical output signals to deliver a first shifted analogical output signal of the sensor device, and
    a second part including at least one passive analogical component having a variable parameter, the second part being configured to selectively process the at least two analogical output signals to deliver a second shifted sinusoidal signal of the sensor device, different from the first shifted analogical output signal; and
  a control component for controlling the variable parameters of the passive analogical components, a variation of these variable parameters shifting at least one of the analogical output signals of the sensor device in the shifter circuit; and
  wherein the shifter circuit delivers at least two analogical output signals of the sensor device, among which at least one shifted output signal including at least one of the first shifted analogical output signal and the second shifted sinusoidal signal of the sensor device; and
a shifter housing in which the shifter circuit is located and which is handleable independently of a housing of the sensor device belonging to the system,
wherein the first part and the second part of the shifter circuit each includes a primary passive analogical component having a variable primary parameter,
wherein each variable primary parameter comprises a simultaneous variation,
wherein the simultaneous variation is adopted by the control component to shift the at least two analogical output signals of the sensor device on a primary predetermined shift interval (45°-90°), and
wherein the shifter circuit delivers two shifted analogical output signals.

16. The shifter module according to claim 15, wherein the control component belonging to the system are also located inside the shifter housing.

17. A method for shifting at least one analogical output signal of a sensor device, which comprises at least two detection cells adapted to equip a mechanical device, the method comprising:
(A) delivering, by the sensor device, at least two analogical output signals depending on behavior of the mechanical device;
(B) selectively processing, by a shifter circuit, the analogical output signals, with at least one of:
  a first part of the shifter circuit, including at least one passive analogical component having a variable parameter, selectively processes the at least two analogical output signals to deliver a first shifted analogical output signal; and
  a second part of the shifter circuit, including at least one passive analogical component having a variable parameter, selectively processes the at least two analogical output signals to deliver a second shifted analogical output signal, different from the first shifted analogical output signal;
(C) forming, by a control component, a shifting system together with the sensor device and the shifter circuit, control the variable parameters of the passive analogical components, a variation these variable parameters shifting at least one of the analogical output signals of the sensor device in the shifter circuit; and
(D) delivering, by the shifter circuit, at least two analogical output signals of the sensor device, among which at least one shifted output signal including at least one of the first shifted analogical output signal and the second shifted sinusoidal signal of the sensor device,
wherein the first part and the second part of the shifter circuit each includes a primary passive analogical component having a variable primary parameter,
wherein each variable primary parameter comprises a simultaneous variation,
wherein the simultaneous variation is adopted by the control component to shift the at least two analogical output signals of the sensor device on a primary predetermined shift interval (45°-90°), and
wherein the shifter circuit delivers two shifted analogical output signals.

* * * * *